United States Patent
Lam He et al.

(10) Patent No.: US 10,803,402 B2
(45) Date of Patent: Oct. 13, 2020

(54) AUTOPILOT NETWORK SERVICE PROCESSING

(71) Applicant: NCR Corporation, Duluth, GA (US)

(72) Inventors: Irma Lam He, Sunnyvale, CA (US); Christopher Merik Chen, East Palo Alto, CA (US); Swati Sachdeva, Fremont, CA (US)

(73) Assignee: NCR Corporation, Atlanta, GA (US)

( * ) Notice: Subject to any disclaimer, the term of this patent is extended or adjusted under 35 U.S.C. 154(b) by 829 days.

(21) Appl. No.: 15/474,272

(22) Filed: Mar. 30, 2017

(65) Prior Publication Data

US 2018/0287957 A1    Oct. 4, 2018

(51) Int. Cl.
  *G06N 20/00*  (2019.01)
  *H04L 29/08*  (2006.01)
  *G06N 5/04*   (2006.01)
  *G06Q 40/00*  (2012.01)

(52) U.S. Cl.
  CPC .............. *G06N 20/00* (2019.01); *G06N 5/04* (2013.01); *H04L 67/14* (2013.01); *G06Q 40/00* (2013.01)

(58) Field of Classification Search
  CPC .......... H04L 67/14–67/148; G06K 9/62–9/726
  See application file for complete search history.

(56) References Cited

U.S. PATENT DOCUMENTS

| 6,519,576 B1* | 2/2003 | Freeman ................. G06Q 30/02 706/21 |
| 2017/0109640 A1* | 4/2017 | Marcu .................. G06F 11/3672 |
| 2017/0109657 A1* | 4/2017 | Marcu .................. G06F 11/3672 |
| 2017/0270416 A1* | 9/2017 | Sri ........................ G06F 16/9566 |
| 2018/0075516 A1* | 3/2018 | Barkan ................... G06F 17/18 |

OTHER PUBLICATIONS

Pourmasoumi, Asef et al.; Business process mining; 2017; Encyclopedia With Semantic Computing and Robotic Intelligence vol. 1, No. 1; pp. 1-8. (Year: 2017).*
Van Der Aalst, Wil et al.; Process Mining: Overview and Opportunities; 2012; ACM Transactions on Management Information Systems, vol. 3, No. 2, Article 7; pp. 7:1-7:17. (Year: 2012).*
Poggi, Nicolas et al.; Business Process Mining from E-commerce Web Logs; 2013; 16 pages. (Year: 2013).*
Van Der Aalst, Wil et al.; Process Mining Manifesto; 2012; BPM 2011 Workshops, Part I, LNBIP; pp. 169-194. (Year: 2012).*

* cited by examiner

*Primary Examiner* — Stanley K. Hill
(74) *Attorney, Agent, or Firm* — Schwegman, Lundberg & Woessner (57) ABSTRACT

Resource-action pairs are tracked for a user during network sessions with a network service. A predicted path for a future network session is learned. When the user logs into the network service for a subsequent network session with the network service, the predicted path can be executed automatically for the user with the network service during that subsequent network session.

18 Claims, 4 Drawing Sheets

AUTOPILOT NETWORK SERVICE PROCESSING

BACKGROUND

Users access a variety of network services associated with accounts of the users. Typically, a user performs the same or similar operations each time the user logs into one of the user's network services. With some frequency, the user may forget one or two operations during one of the repetitive sessions with the user's network service. This is not only a waste time for the user, but can also cause problems for them.

For example, with some network services, such as banking network services when the user forgets to make a bill payment to a utility company during a banking session. The user may have their account flagged as past due, which may cause their utilities to be shut off, and cause them to owe a hefty late fee to the utility company.

SUMMARY

In various embodiments, methods and a system are presented for autopilot network service processing.

According to an embodiment, a method for autopilot network service is presented. Specifically, in an embodiment, sessions between a user and a service are learned. A predicted path for a subsequent session is determined based on the learned sessions and the predicted path is automatically processed when the user confirms in the subsequent session.

DETAILED DESCRIPTION

Figure 1:
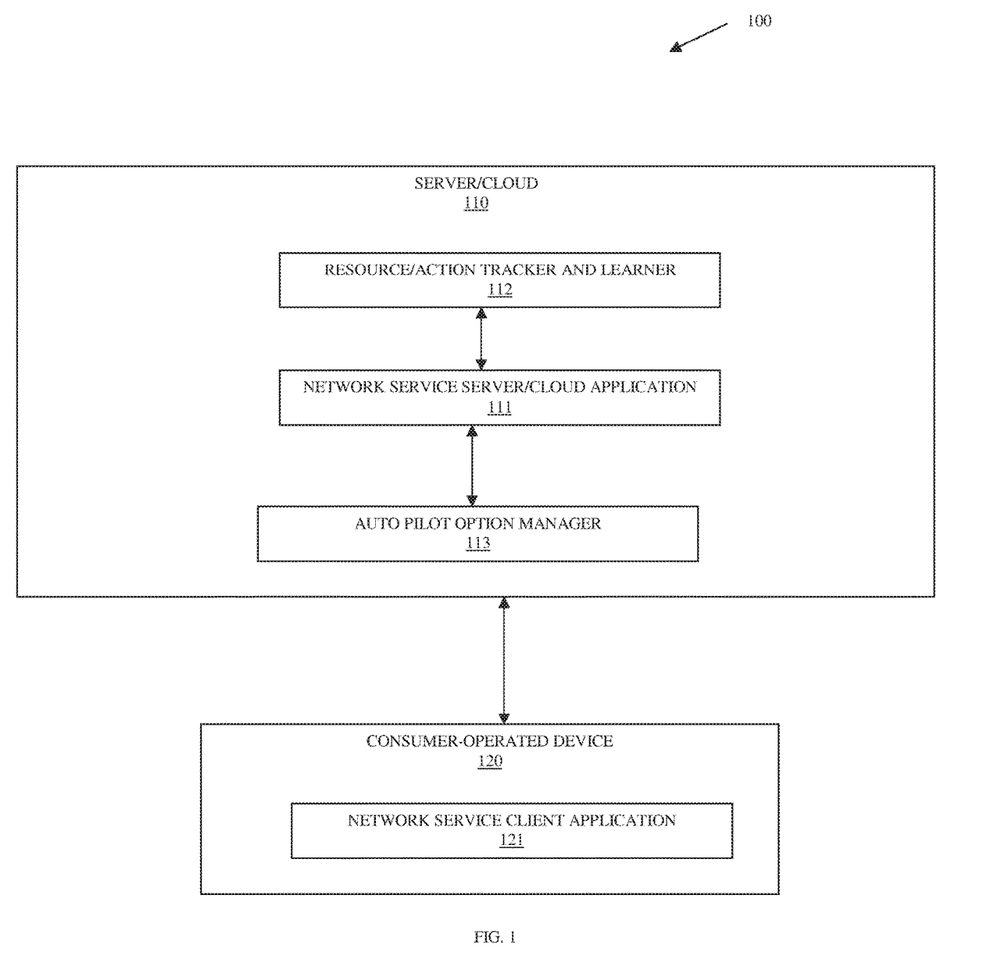
FIG. 1 is a diagram of a system 100 for autopilot network service, according to an example embodiment.

FIG. 1 is a diagram of a system 100 for autopilot network service, according to an example embodiment. It is to be noted that the components are shown schematically in greatly simplified form, with only those components relevant to understanding of the embodiments being illustrated.

Furthermore, the various components (that are identified in the FIG. 1) are illustrated and the arrangement of the components is presented for purposes of illustration only. It is to be noted that other arrangements with more or less components are possible without departing from the teachings of autopilot network service processing presented herein.

The system 100 includes a hardware server or cloud environment (set of cooperating hardware servers) 110 (hereinafter just "server 100"), a network service server application 111, a resource/action tracker and learner 112, and an autopilot option manager 113. The system 100 also includes a consumer-operated device 120 and a network service client application 121.

In an embodiment, the consumer-operated device 120 can include: a tablet, a laptop, a wearable processing device, a laptop, a desktop computer, a Self-Service Terminal (SST) being operated by the consumer at a checkout with a retailer, an intelligent appliance with processor and memory capabilities that is part of the Internet-Of-Things (IoTs), a processing device integrated into a vehicle providing in-vehicle network processing capabilities, and the like. In an embodiment, the SST is an Automated Teller Machine (ATM) or a kiosk.

The network service server/cloud application 111 provides access to a network service from the server 110. Network access to the network service occurs through consumer-past actions in an interface associated with the network service client application 121 from the consumer-operated device 120. In an embodiment, the network service client application 121 is rendered within a web browser as a series of web pages provided by the network service server/cloud application 111. In an embodiment, the network service client application 121 is a mobile application that executes on the consumer-operated device 120 and processes Application Programming Interface (API) calls between a consumer-facing interface rendered by the network service client application 121 that the consumer interacts with and the network service server/cloud application 111.

As used herein, the terms "consumer," "customer," and/or "user" may be used interchangeably and synonymously.

In an embodiment, the network service client application 121 is executed on network-voice enabled device, such as Amazon Echo®, Google Home®, and Siri®. A voice-to-text and text-to-voice interface plugin provides automated consumer interaction with the network service client application 121 and the network service server/cloud application 111.

Similarly, the network service client application 121 can be interfaced to any automated chat bot that uses Natural Language Processing (NLP) to bridge consumer interaction from the network service client application 121 and an automated chat bot that interfaces to network service server/cloud application 111. The automated interaction can occur through Short Message Service (SMS) text messages or through social media messages.

During operation, the consumer initiates the network service client application 121 to authenticate for access to the network service provided through the network service server/cloud application 111. Once authenticated to the network service, a consumer identifier is assigned to the communication session between the network service client application 121 and the network service server/cloud application 111. The consumer identifier uniquely identifies an identity of the consumer and provides a link to the consumer's profile and any account that the consumer has with the enterprise that provides the network service.

When the consumer is logged into an authenticated session, the resource/action tracker and learner 112 is initiated. The resource/action tracker and learner 112 keeps track of the resources accessed by the consumer during the session. In an embodiment, the resource can include: a specific web-rendered page, a specific database searched, a specific file accessed, and/or a specific operation processed. In an embodiment, the actions are selections that the consumer made during the session when presented with a specific resource. For example, while the user is accessing an account view page (specific resource), the user could select from that page 10 different operations or actions. In this manner, an action can be a resource, but the action is defined within the context of a prior selected resource. A resource can be a composite resource that includes other resources. For example, a specific web page resource includes other resources such as a change of web page, perform a search, etc. So, an action is defined as a selection of a resource made within a specific resource context.

The resource/action tracker and learner 112 records each resource during an authenticated session accessed by the user and when the user is presented with selections between resources within a specific previously-selected resource, the resource/action tracker and leaner 112 records this as a resource-action pair made by the user. Essentially, the resource/action tracker and learner 112 records the entire user session, such that the entire session can subsequently be replayed.

During the recording process, the resource/action tracker and learner 112 keeps track of other metadata as well that is available for the recorded session, such as, the date of the session, the day of the week of the session, the time of the day for the session, the length of the session, the elapsed time the user remained within or on a specific resource within the session before making an action selection to establish a resource-action pair. This metadata along with the resource-action pairs are retained for the user based on the user's consumer identifier for the session.

The resource-action pair selections made from login to a session until logout of a session is referred to as a user's path for the session.

Each time the user logins and logouts out, the path is noted. Different paths from session to session may be established based on day of month, day of week, etc. Moreover, more prevalent paths have their resource-action pairs weighted more heavily. This permits the resource/action tracker and learner 112 to learn the behavior of the user with the network service for any given session and permits the resource/action tracker and learner 112 to predict a path for the user during a subsequent and future login session. In an embodiment, the learning is based on a predefined number of previously recorded user sessions. In an embodiment, the learning is based on a machine learning algorithm configured with a threshold that when reached indicates to the resource/action tracker and learner 112 that the user's behavior can be predicted for a next user login session.

On subsequent logins by the user for subsequent sessions, the resource/action tracker and leaner 112 instructs the autopilot option manager 113 that the user's path for the session has been learned and can be automatically replayed for the user during the session. The autopilot option manager 113 then presents an option for the user after a login screen for the session providing within the network service server/cloud application an option for the user to replay a previous session for this new session. The auto play option is exposed to the user in the network service client application 121 for user selection. Replay processing is not just a video of what the user previously did; rather it is specific resource-action pairs selected in a predefined order that are processed within the session on behalf of the user. Hence, the processing is more of an autopilot process that performs operations in specific ordered sequence with the network service.

The autopilot option manager 113 can provide a variety of selectable options for the user to pause, change, resume, and take control of the auto processed session. When users select these options during an autopilot processing session, the resource/action tracker and learner 112 makes note of the changes within the specific path and resource-action selections. This is used to change the weights to the resource-action selections and paths for sessions to improve learning the user's behavior and to continually and dynamically update the predicted paths for the user during any given session.

Moreover, the resource/action tracker and learner 112 may identify a different predicted path for the user based on the day of the month of a session, day of the week for a session, and/or the number of prior sessions by the user within a week or a month. For example, the first session by a user for a month may be noticed as a user attempting to use a bill pay feature for the network service (the network service being a banking service provided over the web) while the second access by the user for the month is to check deposits and transactions. So, the predicted path for autopilot processing for a first monthly session by the user with the banking application may be the learned path that pays predefined bills whereas the second session by the user has a different predicted path that views details of the checking account from the beginning of the month to the current date.

In an embodiment, the autopilot option manager 113 includes a text-to-speech interface that permits the user to select to have an audible description read to the user during autopilot processing, such as accessing your checking account transaction page. The user can customize this feature to have a preconfigured number of transactions read before the next resource-action in the predicted path is processed during autopilot processing. This feature can even audibly tell the user how to take manual control, how to resume, and how to change a resource-action pair in the predicted path. Text appearing on any resource-action view can be read to the user. In an embodiment, the user can take control through audible commands, such as saying stop or pause, page down, resume, etc.

In an embodiment, the autopilot option manager 113 may present the user with the list of resource-action pairs in the predicted path that is going to be processed. The user can delete specific resource-action pairs, add new resource-action pairs, and/or rearrange the order of the path so as to modify the predicted path to a user-modified predicted path. The user can then select the autopilot processing for the user-modified predicted path to process with the network service.

In an embodiment, the user can select and execute a predicted path through an automated chat bot, such as through a network-enabled voice device, an SMS text message thread, or a social media chat bot session (such as through Twitter®, Facebook®, etc.). The chat bots include a front-end that interfaces with the user through voice or messages and a backend that interfaces through API calls with the autopilot option manager 113. In this way, the user can perform the autopilot processing from a variety of communication channels (all automated natural language speaking, text messaging, and/or social media messages).

In an embodiment, the user can select and execute a predicted path from an SST, such as an ATM. In an embodiment, the user can select and execute a predicted path from a kiosk (such as a self-service grocery checkout station).

In an embodiment, the resource/action tracker and learner 112 determines a predicted path for a session of a user while the user is in the middle of a session. In this embodiment, the autopilot option manager 113 is activated during the existing session and presents the user with the remaining resource-action pairs for the predicted path and asks the user whether the user wants to perform autopilot processing on the remainder of the path (the portion that the user has not already processed within the existing session), whether the user does not wish to perform autopilot processing, or whether the user wishes to perform autopilot processing but with a change to the order of the remaining resource-action pairs or an addition/deletion of some of the remaining resource-action pairs.

In an embodiment, as soon as the user logs into a session in which the predicted path is available for the user, the user is presented through the autopilot option manager 113 with the resource-action pairs of the path and asked whether the user wants to perform autopilot processing on the predicted path, whether the user does not wish to perform autopilot processing, or whether the user wishes to perform autopilot processing but with a change to the order of the resource-action pairs or an addition/deletion of some of the resource-action pairs.

In an embodiment, even if the user declines to perform the autopilot processing, a menu option remains available from each resource view for the user to access the remaining resource-actions pairs in a predicted path for modification and processing or acceptance as is for autopilot processing.

In an embodiment and during autopilot processing, the user is presented an option to pause the autopilot processing and take control. Another option allows the user to at any point resume with the auto-pilot processing after the user had previously paused and took manual control over the autopilot processing. If the user performed some of the remaining resource-action pairs during manual control for the predicted path, the autopilot option manager 113 recognizes this and resumes at the next unprocessed resource-action pair in the remaining portion of the unprocessed predicted path.

In an embodiment, the network service is a banking service available to customers for online banking. The path are sets of resource-action pairs learned based on the behavior of the user during previously recorded sessions with the banking service.

It is noted that the network service can be any network service of the user and does not have to exclusively be an online banking service; although as noted in one embodiment, the network service is an online banking service.

These and other embodiments are now discussed with reference to the FIGS. 2-4.

Figure 2:
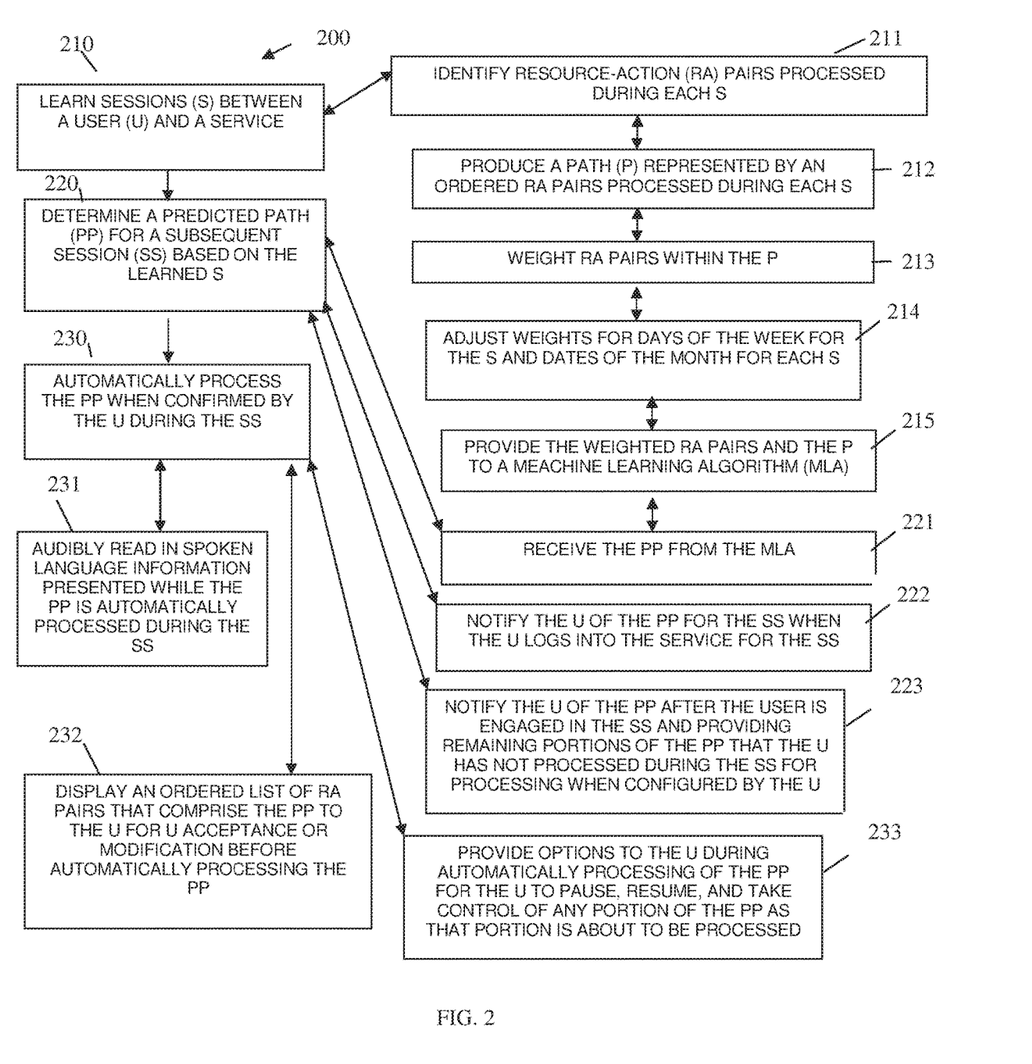
FIG. 2 is a diagram of a method for autopilot network service, according to an example embodiment.

FIG. 2 is a diagram of a method 200 for autopilot network service, according to an example embodiment. The software module(s) that implements the method 200 is referred to as an "autopilot network service manager." The autopilot network service manager is implemented as executable instructions programmed and residing within memory and/or a non-transitory computer-readable (processor-readable) storage medium and executed by one or more processors of a device. The processor(s) of the device that executes the autopilot network service manager are specifically configured and programmed to process the autopilot network service manager The autopilot network service manager has access to one or more network connections during its processing. The network connections can be wired, wireless, or a combination of wired and wireless.

In an embodiment, the device that executes the autopilot network service manager is the device 110.

In an embodiment, the device that executes the autopilot network service manager is a SST. In an embodiment, the SST is an ATM. In an embodiment, the SST is a kiosk.

In an embodiment, the device that executes the autopilot network service manager is one of: a tablet computer, a mobile phone, a laptop computer, a wearable processing device, an automated voice network-enabled device, an IoT-enabled device, or a desktop computer.

In an embodiment, the device that executes the autopilot network service manager is a server.

In an embodiment, the device that executes the autopilot network service manager is a cloud processing environment for which the device is a part of.

In an embodiment, the autopilot network service manager is all or some combination of the resource/action tracker and learner 112, the network service server/cloud application 111, the autopilot option manager 113, and/or the network service client application 121.

At 210, the autopilot network service manager learns sessions between a user and a service. In an embodiment, the service is a network-accessible banking or financial service provided from a financial institution.

In an embodiment, at 211, the autopilot network service manager identifies resource-action pairs processed during each session of the user with the service. Actions are resources but defied as a sub-resource that is selected within a composite resource. Resources can include page views within a website, files, operations, etc. A resource-action pair is therefore a resource being viewed or accessed by a user within the service where the user has available of a plurality of sub-resources to select from any specific selection to a sub-resource within this context is a resource-action pair that is tracked during the user's sessions with the service.

In an embodiment of 211 and at 212, the autopilot network service manager produces a path represented by ordered resource-action pairs processed during and for each of the user's session with the service. The user-navigated specific sequence of resource-action pairs within a particular session provides a particular path for that session.

In an embodiment of 212 and at 213, the autopilot network service manager weights resource-action pairs within the paths for the user's previous session.

In an embodiment of 213 and at 214, the autopilot network service manager adjusts the weights for the resource-action pairs for days of the week for which each session occurs and dates of the month for which each session occurs. In an embodiment, the number of times that a user accesses the service within a month is also used to adjust the weights.

In an embodiment of 215 and at 216, the autopilot network service manager provides the weighted resource-action pairs to a machine learning algorithm for learning the sessions through the paths comprised of weighted resource-action pairs.

At 220, the autopilot network service manager determines a predicted path for a subsequent or future session that the user has not yet had with the service based on the learned sessions.

According to an embodiment of 216 and 220, at 221, the autopilot network service manager receives the predicted path from the machine learning algorithm.

In an embodiment, at 222, the autopilot network service manager notifies the user of the predicted path from the subsequent session when the user logs into the service for the subsequent session.

In an embodiment, at 223, the autopilot network service manager notifies the user of the predicted path after the user is engaged in the subsequent session and provides remaining portions of the predicted path that the user has not yet processed during the subsequent session for automatic processing by the autopilot network service manager. For example, the user may be logged into the subsequent session and already manually performed at least one or more resource-action pairs that comprise the predicted path with the service when the autopilot network service manager determines the predicted path. Here, the remaining resource-action pairs within the predicted path that have not yet been processed within the service can be presented to the user for the user to confirm whether or not the user desires the autopilot network service manager to perform autopilot processing on the remaining portion of the unprocessed predicted path with the service.

At 230, the autopilot network service manager automatically processes the predicted path when the user confirms that the user wants autopilot processing performed with the service on behalf of the user during the subsequent session for which the user is now engaged in with the service.

In an embodiment, at 231, the autopilot network service manager audibly reads in spoken language information presented while the predicted path is automatically being processed during the subsequent session on behalf of the user and through the service.

In an embodiment, at 232, the autopilot network service manager displays an ordered list of resource-action pairs that comprise the predicted path to the user for: user acceptance, for user modification, and/or user addition with one or more new resource-action pairs. This is done before the autopilot network service manager automatically processes (autopilot processing) the predicted path within the service on behalf of the user.

According to an embodiment, at 233, the autopilot network service manager provides options to the user during automatic processing of the predicted path for the user to: pause the automatic processing, resume following a pause of the automatic processing, and/or take control of any portion of the predicted path as that portion is about to be processed and before that portion is actually processed by the autopilot network service manager.

Figure 3:
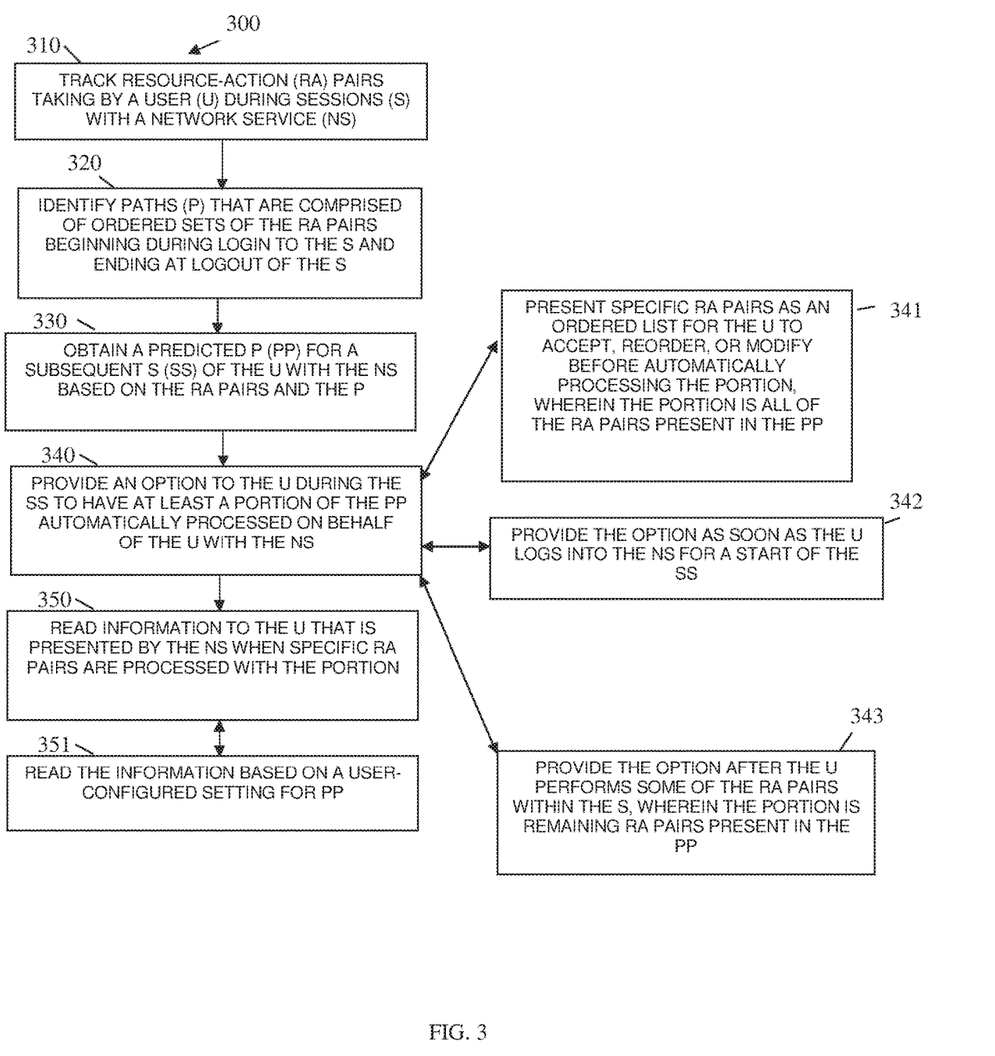
FIG. 3 is a diagram of another method for autopilot network service, according to an example embodiment.

FIG. 3 is a diagram of another method 300 for autopilot network service, according to an example embodiment. The software module(s) that implements the method 300 is referred to as an "autopilot controller." The autopilot controller is implemented as executable instructions programmed and residing within memory and/or a non-transitory computer-readable (processor-readable) storage medium and executed by one or more processors of a device. The processors that execute the autopilot controller are specifically configured and programmed to process the autopilot controller. The autopilot controller has access to one or more network connections during its processing. The network connections can be wired, wireless, or a combination of wired and wireless.

In an embodiment, the device that executes the autopilot controller is the device 110.

In an embodiment, the device that executes the autopilot controller is a SST. In an embodiment, the SST is an ATM. In an embodiment, the SST is a kiosk.

In an embodiment, the device that executes the autopilot controller is one of: a tablet computer, a wearable processing device, a voice networked-enabled device, an IoT-enabled device, a mobile phone, a laptop computer, or a desktop computer.

In an embodiment, the device that executes the autopilot controller is a server.

In an embodiment, the device that executes the autopilot controller is a cloud processing environment for which the device is a part of.

In an embodiment, the autopilot controller is all or some combination of: the resource/action tracker and learner 112, the network is a service server/cloud application 111, the autopilot option manager 113, the network service client application 121, and the method 200.

At 310, the autopilot controller tracks resource-action pairs taken by the user during session that the user has with a network service. The resource-action pairs are as defined above with the FIGS. 1 and 2.

At 320, the autopilot controller identifies paths that are comprised of ordered sets of the resource-action pairs during login to the session and ending at logout of the session.

At 330, the autopilot controller obtains a predicted path for a subsequent and as of yet unprocessed session of the user with the network service based on the ordered resource-action pairs and the paths from the prior sessions in which the behavior and actions of the user were tracked and analyzed for those prior and historic sessions.

At 340, the autopilot controller provides an option to the user during the subsequent session (once the user establishes the subsequent session with the network service) to have at least a portion of the predicted path automatically processed on behalf of the user with the network service. This is the autopilot processing of a complete subsequent session or a portion of the subsequent session.

In an embodiment, at 341, the autopilot controller presents specific resource-action pairs as an ordered list for the user to accept, reorder (in a user-defined manner) or modify (through addition or deletion of resource-action pairs) before the autopilot controller automatically processes the portion. In this embodiment, the presented portion is all of the resource-action pairs that are present in the predicted path.

In an embodiment, at 342, the autopilot controller provides an option as soon to the user when the user logs into the network service to start of a subsequent session.

In an embodiment, at 343, the autopilot controller provides an option to the user after the user has already manually performed some of the resource-action pairs within the session. In this embodiment the portion, at 340, is remaining resource-action pairs present in the predicted path that the user has not already manually performed during the subsequent session.

According to an embodiment, at 350, the autopilot controller reads information to the user that is presented by the network service when specific resource-action pairs are being processed with the portion.

In an embodiment, at 351, the autopilot controller reads the information presented based on a user-configured setting or profile for the predicted path. In an embodiment, the user can have specific pieces of information read during the autopilot processing as defined by the user.

Figure 4:
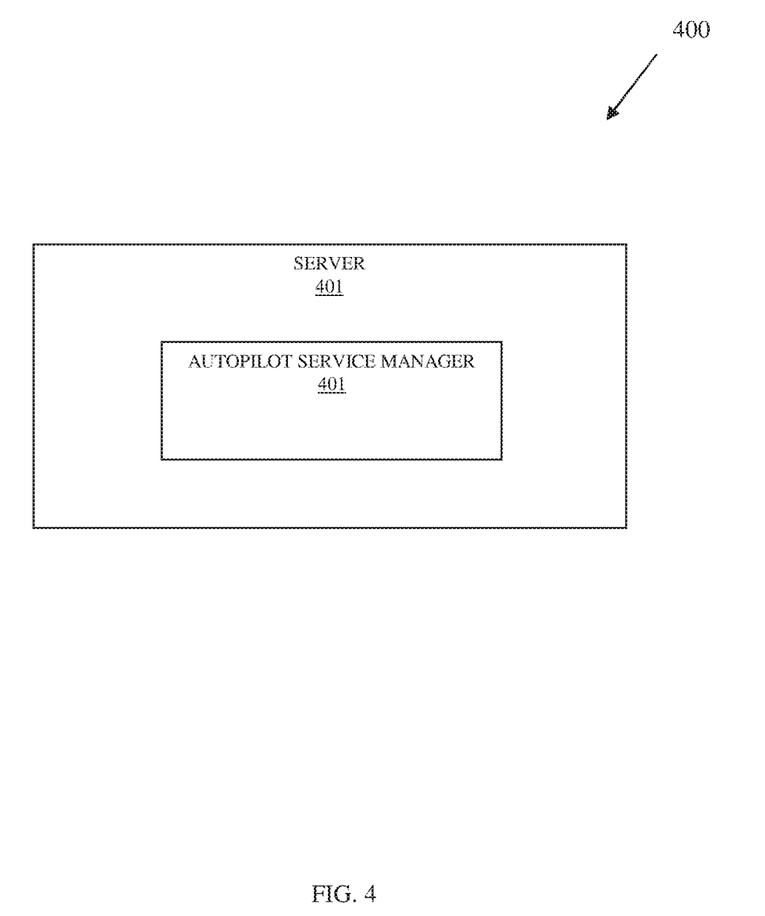
FIG. 4 is a diagram of a system for autopilot network service, according to an example embodiment.

FIG. 4 is a diagram of a system 400 for autopilot network service, according to an example embodiment. The system 400 includes a variety of hardware components and software components. The software components of the system 400 are programmed and reside within the memory of a non-transitory computer-readable medium and executes on one or more processors of the system 400. The system 400 may communicate over one or more networks, which can be wired or wireless or, a combination of wired and wireless.

In an embodiment, the system 400 is implemented on the device 110 of the FIG. 1.

In an embodiment, the system 400 is implemented on a server.

In an embodiment, the system 400 is implemented on one or more hardware servers that comprise a cloud processing environment (cloud).

In an embodiment, the system 400 implements, inter alia, the processing discussed above with the FIGS. 1-3.

The system includes a server 401 and an autopilot service manager 402.

The autopilot service manager 402 is configured to: 1) executed by one or more hardware processors of the server 401, 2) learns paths accessed by a user during sessions of the user with a network-service, 3) predicts a path for a subsequent session of the user, and 4) automatically processes at least a portion of the path during the subsequent session with the network service on behalf of the user.

In an embodiment, the network-service is a financial or banking service provided by a bank or financial institution of the user.

In an embodiment, the autopilot service manager 402 is all or some combination of the processing discussed above with the FIGS. 1-3.

In an embodiment, the autopilot service manager 402 is further configured to.

It should be appreciated that where software is described in a particular form (such as a component or module) this is merely to aid understanding and is not intended to limit how software that implements those functions may be architected or structured. For example, modules are illustrated as separate modules, but may be implemented as homogenous code, as individual components, some, but not all of these modules may be combined, or the functions may be implemented in software structured in any other convenient manner.

Furthermore, although the software modules are illustrated as executing on one piece of hardware, the software may be distributed over multiple processors or in any other convenient manner.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A method, comprising:
learning, by executable instructions that are executed by a processor from a non-transitory computer-readable storage medium of a device, sessions between a user and a service;
determining, by the executable instructions, a predicted path for a subsequent session based on the learned sessions; and
automatically processing, by the executable instructions, the predicted path when confirmed by a login by the user into the subsequent session.

2. The method of claim 1, wherein learning further includes identifying resource-action pairs processed during each of the sessions.

3. The method of claim 2 further comprising, producing, by the executable instructions, particular paths as an ordered set of the resource-action pairs beginning at the login for each additional user session and ending at a logout for that session.

4. The method of claim 3, wherein producing further includes weighting the resource-action pairs within the particular paths.

5. The method of claim 4, wherein weighting further includes adjusting weights for days of the week for the sessions and dates of the month for the sessions.

6. The method of claim 5, wherein adjusting further includes providing the weighted resource-action pairs and the particular paths to a machine learning algorithm.

7. The method of claim 6, wherein determining further includes receiving the predicted path from the machine learning algorithm.

8. The method of claim 1, wherein determining further includes notifying the user of the predicted path for the subsequent session when the user logs into the service for the subsequent session.

9. The method of claim 1, wherein determining further includes notifying the user of the predicted path after the user is engaged in the subsequent session and providing remaining portions of the predicted path that the user has not processed during the subsequent session for processing when configured by the user.

10. The method of claim 1, wherein automatically processing further includes audibly reading in spoken language information presented while the predicted path is automatically processed during the subsequent session.

11. The method of claim 1, wherein automatically processing further includes displaying an ordered list of resource-action pairs that comprise the predicted path to the user for user acceptance or modification before automatically processing the predicted path.

12. The method of claim 1 further comprising, providing, by the executable instructions, options to the user during automatically processing of the predicted path for the user to pause, resume, and take control of any portion of the predicted path as that portion is about to be processed.

13. A method, comprising:
tracking resource-action pairs taken by a user during sessions with a network service;
identifying paths that are comprised of ordered sets of the resource actions pairs beginning during login to the sessions and ending at logout of the sessions;
obtaining a predicted path for a subsequent session of the user with the network service based on the resource-action pairs and the paths; and
providing an option to the user during the subsequent session to have at least a portion of the predicted path automatically processed on behalf of the user with the network service, wherein providing further includes providing the option as soon as the user logs into the network service for a start of the subsequent session.

14. The method of claim 13 further comprising, audibly reading text-based information to the user that is presented by the network service when specific resource-action pairs are processed with the portion.

15. The method of claim 14, wherein audibly reading further includes reading the text-based information based on a user-configured setting for the predicted path.

16. The method of claim 13, wherein providing further includes presenting specific resource-action pairs as an ordered list for the user to accept, reorder, or modify before automatically processing the portion, wherein the portion is all of the resource-action pairs present in the predicted path.

17. A system, comprising:
a server comprising a processor and a non-transitory computer-readable storage medium;
the non-transitory computer-readable storage medium comprising executable instructions;
the executable instructions when executed by the processor from the non-transitory computer-readable storage medium cause the processor to perform processing comprising:

autopilot service manager 402 is configured to: 1) execute on one or more processors of the server, 2) learning paths accessed by a user during sessions of the user with a network-service;
predicting a path for a subsequent session of the user; and
automatically processing at least a portion of the path during the subsequent session with the network service on behalf of the user, wherein the at least a portion of the path is processed as soon as the user logs into the network service for a start of the subsequent session.

18. The system of claim 17, wherein the network service is a banking or financial service of the user.

\* \* \* \* \*